United States Patent
Poddar

(10) Patent No.: US 11,545,141 B1
(45) Date of Patent: Jan. 3, 2023

(54) OMNI-CHANNEL ORCHESTRATED CONVERSATION SYSTEM AND VIRTUAL CONVERSATION AGENT FOR REALTIME CONTEXTUAL AND ORCHESTRATED OMNI-CHANNEL CONVERSATION WITH A HUMAN AND AN OMNI-CHANNEL ORCHESTRATED CONVERSATION PROCESS FOR CONDUCTING REALTIME CONTEXTUAL AND FLUID CONVERSATION WITH THE HUMAN BY THE VIRTUAL CONVERSATION AGENT

(71) Applicant: Ashwarya Poddar, Kirkland, WA (US)

(72) Inventor: Ashwarya Poddar, Kirkland, WA (US)

(73) Assignee: ConverzAI Inc., Kirkland, WA (US)

( * ) Notice: Subject to any disclaimer, the term of this patent is extended or adjusted under 35 U.S.C. 154(b) by 0 days.

(21) Appl. No.: 17/723,105

(22) Filed: Apr. 18, 2022

Related U.S. Application Data

(60) Provisional application No. 63/176,043, filed on Apr. 16, 2021.

(51) Int. Cl.

| | | |
|---|---|---|
| G10L 15/18 | (2013.01) |
| G10L 15/30 | (2013.01) |
| G10L 15/22 | (2006.01) |
| H04M 3/42 | (2006.01) |
| G06F 40/35 | (2020.01) |
| G06F 40/166 | (2020.01) |
| G10L 13/02 | (2013.01) |

(52) U.S. Cl.
CPC ........ *G10L 15/1815* (2013.01); *G06F 40/166* (2020.01); *G06F 40/35* (2020.01); *G10L 13/02* (2013.01); *G10L 15/22* (2013.01); *G10L 15/30* (2013.01); *H04M 3/42221* (2013.01)

(58) Field of Classification Search
USPC ................ 704/231, 232, 246, 247, 251, 252
See application file for complete search history.

(56) References Cited

U.S. PATENT DOCUMENTS

| | | | | |
|---|---|---|---|---|
| 2007/0071206 A1* | 3/2007 | Gainsboro | ............ | H04M 3/568 |
| | | | | 379/168 |
| 2015/0186156 A1* | 7/2015 | Brown | .................... | H04L 51/02 |
| | | | | 715/706 |
| 2019/0102078 A1* | 4/2019 | Bhatt | ....................... | G06F 40/30 |
| 2020/0243062 A1* | 7/2020 | Scodary | .................. | G10L 15/26 |
| 2022/0044679 A1* | 2/2022 | Sima | .................... | G10L 19/032 |
| 2022/0180857 A1* | 6/2022 | Aharoni | .................. | G10L 15/22 |
| 2022/0180858 A1* | 6/2022 | Aharoni | ................ | H04L 67/133 |

* cited by examiner

*Primary Examiner* — Leonard Saint-Cyr
(74) *Attorney, Agent, or Firm* — Plager Schack LLP; Mark H. Plager; Stephen Hallberg

(57) ABSTRACT

An omni-channel orchestrated conversation system and virtual conversation agent for realtime contextual and orchestrated omni-channel conversation with a human and an omni-channel orchestrated conversation process for conducting realtime contextual and fluid conversation with a human by a virtual conversation agent in relation to a particular domain are disclosed.

6 Claims, 5 Drawing Sheets

OMNI-CHANNEL ORCHESTRATED CONVERSATION SYSTEM AND VIRTUAL CONVERSATION AGENT FOR REALTIME CONTEXTUAL AND ORCHESTRATED OMNI-CHANNEL CONVERSATION WITH A HUMAN AND AN OMNI-CHANNEL ORCHESTRATED CONVERSATION PROCESS FOR CONDUCTING REALTIME CONTEXTUAL AND FLUID CONVERSATION WITH THE HUMAN BY THE VIRTUAL CONVERSATION AGENT

CLAIM OF BENEFIT TO PRIOR APPLICATION

This application claims benefit to U.S. Provisional Patent Application 63/176,043, entitled "FLUID CONVERSATION SYSTEM AND VIRTUAL SPEECH AGENT FOR REALTIME CONTEXTUAL AND FLUID SPEECH CONVERSATION WITH A HUMAN," filed Apr. 16, 2021. The U.S. Provisional Patent Application 63/176,043 is incorporated herein by reference.

BACKGROUND

Embodiments of the invention described in this specification relate generally to virtual communication systems and virtual responsive text bots, and more particularly, to an omni-channel orchestrated conversation system and virtual conversation agent for realtime contextual and orchestrated omni-channel conversation with a human and an omni-channel orchestrated conversation process for conducting realtime contextual and fluid conversation with a human by a virtual conversation agent.

Existing virtual conversation systems, such as chat "bots" and the like, have various limitations that make them unsuitable for many types of conversations. These limitations include, non-exhaustively, inability to hold a realtime, spontaneous and contextually relevant telephonic speech conversation with a human (e.g., not able to engage in a realtime telephonic screening of a candidate for employment), inability to effectively handle interruptions by the human speaker during the conversation, lack of domain-specific conversational data for language processing, inability to engage in non-linear conversations, and the inability to ask contextually-relevant follow up questions when responses from the human speaker are insufficiently clear, detailed, and/or explained.

Therefore, what is needed is a way to provide fluid, orchestrated, and contextual conversations with humans by a virtual conversation agent that conducts fluid, human-like conversations by way of any of several communication channels, including at least telephone, email, and text messaging.

BRIEF DESCRIPTION

A novel omni-channel orchestrated conversation system and virtual conversation agent for realtime contextual and orchestrated omni-channel conversation with a human is disclosed. In some embodiments, the virtual conversation agent engages in contextual and fluid telephonic speech conversation with a human in relation to a particular domain. In some embodiments, the omni-channel orchestrated conversation system supports conversational engagement between a virtual conversation agent and an actual human (such as a job candidate) over telephony, which differs from human-to-human conversational engagement. In particular, the omni-channel orchestrated conversation system provides intelligent, orchestrated conversation by an artificial intelligence engine supported by a machine learning (ML) subsystem that trains the virtual conversation agent to conduct fluid, human-like conversations with a human across any of several channels (e.g., telephonic speech, text message, and email conversations). The virtual conversation agent is designed to simulate the way an actual human speaker would carry out a telephone-based conversation in a particular domain, or otherwise engage in a conversation (such as through email, text messaging in realtime chat, etc.), which helps the omni-channel orchestrated conversation system to advance efforts intended to achieve a goal in connection with the human in the particular domain. In some embodiments, the virtual conversation agent is able to determine whether to ask contextually relevant follow-up questions during the conversation with the human depending on the quality of the human's prior response(s). In some embodiments, the virtual conversation agent generates a summary report when the conversation with the human concludes with information derived from the conversation that is relevant in the particular domain. In some embodiments, the information in the summary report is scored according to one or more aspects pertaining to the particular domain. In particular, the omni-channel orchestrated conversation system also calculates a candidate fit score.

A novel omni-channel orchestrated conversation process for conducting realtime contextual and fluid conversation with a human by a virtual conversation agent is also disclosed. In some embodiments, the omni-channel orchestrated conversation process for conducting realtime contextual and fluid conversation with a human by a virtual conversation agent involves a phone call conversation between the human and the virtual conversation agent. In some embodiments, the omni-channel orchestrated conversation process for conducting realtime contextual and fluid conversation with a human by a virtual conversation agent involves a text message-based conversation between the human and the virtual conversation agent. In some embodiments, the omni-channel orchestrated conversation process for conducting realtime contextual and fluid conversation with a human by a virtual conversation agent involves an email-based conversation between the human and the virtual conversation agent. In some embodiments, the omni-channel orchestrated conversation process for conducting realtime contextual and fluid conversation with a human by a virtual conversation agent converges a text message-based conversation between the human and the virtual conversation agent into a phone call conversation between the human and the virtual conversation agent. In some embodiments, the omni-channel orchestrated conversation process for conducting realtime contextual and fluid conversation with a human by a virtual conversation agent converges an email-based conversation between the human and the virtual conversation agent into a phone call conversation between the human and the virtual conversation agent.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
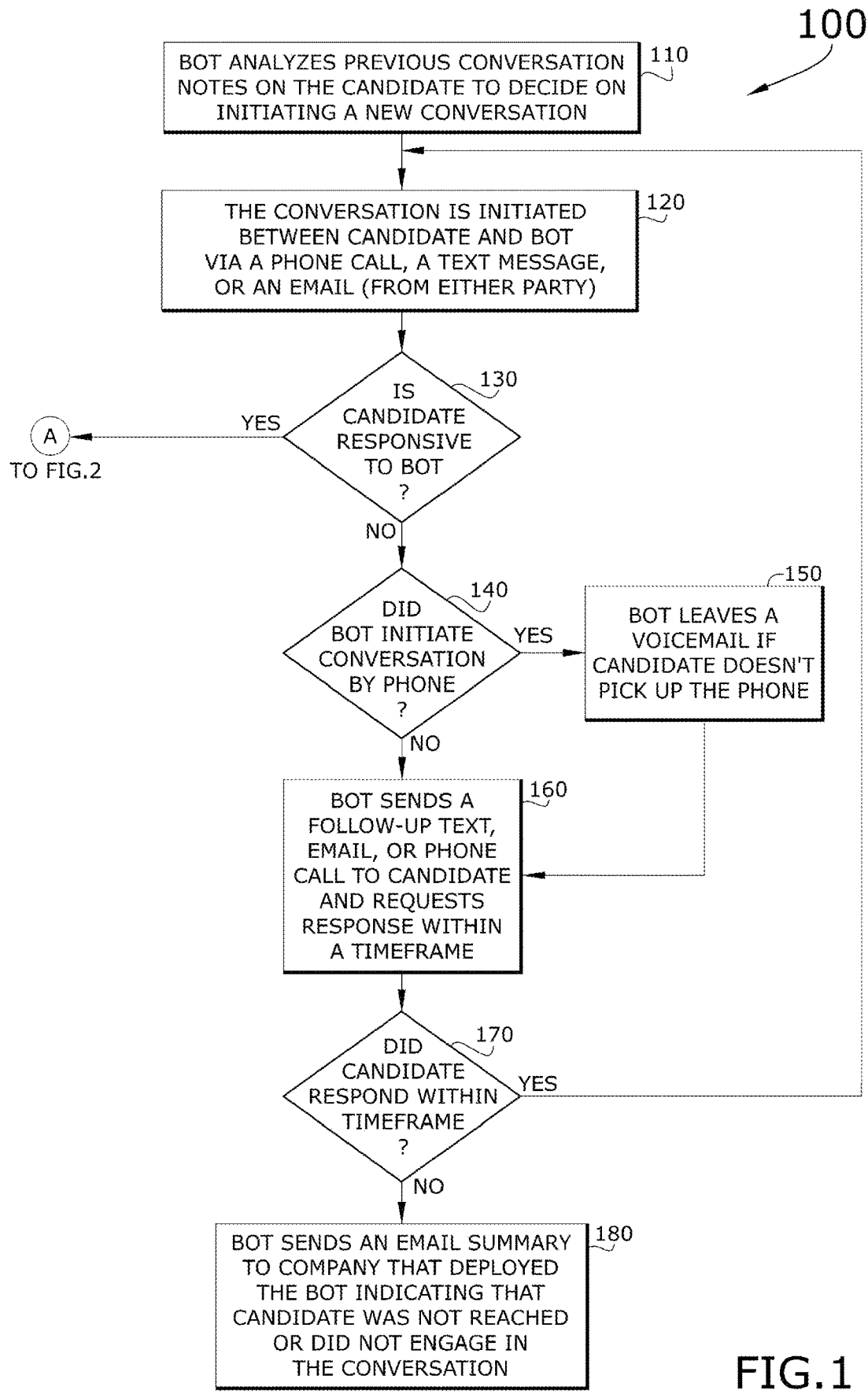
FIG. 1 conceptually illustrates an omni-channel orchestrated conversation process for conducting realtime contextual and orchestrated omni-channel conversation with a human by a virtual conversation agent in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include an omni-channel orchestrated conversation system and virtual conversation agent for realtime contextual and orchestrated omni-channel conversation with a human. In some embodiments, the virtual conversation agent engages in contextual and fluid telephonic speech conversation with a human in relation to a particular domain. In some embodiments, the omni-channel orchestrated conversation system supports virtual conversation agent to actual human conversational engagement over telephony, which differs from human-to-human conversational engagement. In this way, the omni-channel orchestrated conversation system provides the virtual conversation agent to conduct telephonic speech conversations in lieu of providing direct telephone contact with a live human agent. The virtual conversation agent is designed to simulate the way an actual human speaker would carry out a telephone-based conversation in a particular domain, which helps the omni-channel orchestrated conversation system to advance efforts intended to achieve a goal in connection with the human in the particular domain. In some embodiments, the virtual conversation agent is able to determine whether to ask contextually relevant follow-up questions during the telephonic speech conversation with the human depending on the quality of the human's prior response(s). In some embodiments, the virtual conversation agent generates a summary report when the telephonic speech conversation with the human concludes with information derived from the telephonic speech conversation that is relevant in the particular domain. In some embodiments, the information in the summary report is scored according to one or more aspects pertaining to the particular domain. An example of an omni-channel orchestrated conversation system and a virtual conversation agent is described further below, by reference to FIG. 4.

In some embodiments, the virtual domain-specific speech agent is a virtual speech recruiter and the particular domain is candidate recruiting for a job (employment work, contractual work, and the like). In some embodiments, the virtual speech recruiter is used to conduct telephonic speech conversations in lieu of providing direct telephonic contact with a live human recruiter. The omni-channel orchestrated conversation system is designed to simulate the way a human recruiter would carry out a candidate screening telephone call, which then helps to prioritize which candidate can be submitted for a job.

In some embodiments, the omni-channel orchestrated conversation system simulates the way a human would carry out a conversation with a human by way of an omni-channel orchestrated conversation process for conducting realtime contextual and fluid conversation with a human by a virtual conversation agent. In some embodiments, the omni-channel orchestrated conversation process for conducting realtime contextual and fluid conversation with a human by a virtual conversation agent involves a phone call conversation between the human and the virtual conversation agent. In some embodiments, the omni-channel orchestrated conversation process for conducting realtime contextual and fluid conversation with a human by a virtual conversation agent involves a text message-based conversation between the human and the virtual conversation agent. In some embodiments, the omni-channel orchestrated conversation process for conducting realtime contextual and fluid conversation with a human by a virtual conversation agent involves an email-based conversation between the human and the virtual conversation agent. In some embodiments, the omni-channel orchestrated conversation process for conducting realtime contextual and fluid conversation with a human by a virtual conversation agent converges a text message-based conversation between the human and the virtual conversation agent into a phone call conversation between the human and the virtual conversation agent. In some embodiments, the omni-channel orchestrated conversation process for conducting realtime contextual and fluid conversation with a human by a virtual conversation agent converges an email-based conversation between the human and the virtual conversation agent into a phone call conversation between the human and the virtual conversation agent. An omni-channel orchestrated conversation process for conducting realtime contextual and fluid conversation with a human by a virtual conversation agent is described in detail below, by reference to FIGS. 1-3.

In some embodiments, the virtual conversation agent is used to conduct conversations across different channels such as phone call, email, and text in lieu of providing direct contact with a live human agent. In some embodiments, the omni-channel orchestrated conversation system is designed to simulate the way a human agent (recruiter) would carry out fluid contextual conversations—including follow up conversations—across a variety of communication channels, such as voice (telephone), email, and text with another human (candidate screening). Systems in the current arts have various limitations including the inability to hold a real time telephonic screening with a candidate, handle interruptions by the candidate, limitations in language processing due to lack of domain specific conversational data, inability to engage in non-linear conversations and the inability to ask contextual follow up questions. The existing systems also lack in the ability to automatically orchestrate follow up conversations across different channels based on the context of current conversation on one channel. The virtual agent also understands which person to have the conversation with by analyzing the notes of past conversations between a human/virtual agent and the person.

In some embodiments, the omni-channel orchestrated conversation system supports real time speech-based conversation over telephony where the virtual conversation agent (or "virtual recruiter") can understand the human's intent and navigate the conversation, thereby enabling the human candidate at the other end to respond naturally. This natural conversation opens the door for the human candidate to speak at length and describe their experiences in a way that they would only do when talking to a real human. Follow-up probing questions that are asked based on the response assessment of the previous questions, enables the candidates to provide more specifics about their experiences. In some embodiments, the virtual conversation agent is also configured to negotiate with the human candidate when the need arises. In the case of candidate screening, for example, the virtual conversation agent can negotiate pay rates based on the configured pay range and the candidate expectations during the conversation.

Furthermore, critical signals beyond candidate skills that are relevant for hiring decisions are adequately captured by embodiments of the omni-channel orchestrated conversation system described in the present specification. Final output includes a well-constructed call screening summary that includes fitness scores, skills details, and business needs signals categorized into highlights, lowlights and considerations empowers the recruiting team to rapidly make hiring decisions on the candidate.

Thus, the omni-channel orchestrated conversation system and the virtual conversation agent described in this specification solve the problems and limitations of existing virtual communication systems noted above. The intelligent, machine learning approach of the omni-channel orchestrated conversation system obviates the need to engage a live human agent to speak with another human since the virtual conversation agent is designed to simulate the way an actual human speaker would carry out a telephonic speech conversation (or conversation via text messaging or email) in a particular domain.

In some embodiments, the omni-channel orchestrated conversation system and the virtual conversation agent make realtime speech based conversation over telephony possible where the virtual conversation agent presents as a virtual recruiter who understand the human's intent and navigate the telephonic speech conversation in a seemingly natural manner which allows the human candidate at the other end of the call to respond naturally. This natural conversation opens the door for free flow of information, whereby the candidate can speak at length and describe their experiences in a way that they would only do when talking to a real human. Additionally, the virtual conversation agent is configured to utilize an artificial intelligence (AI) engine and a machine learning (ML) sub-system of the omni-channel orchestrated conversation system to seamlessly ask the candidate follow-up probing questions that are based on the AI engine and ML sub-system assessments of the candidate's responses to the previous questions, thereby enabling the candidate to elaborate further and provide more specifics about their experiences. Furthermore, critical signals, beyond candidate skills, that are relevant for hiring decisions are adequately captured by the system. Finally, a well-constructed call screening summary is generated, which includes fitness scores, skills details, and business needs signals categorized into highlights, lowlights, and other considerations which empowers the recruiting team to rapidly make hiring decisions about the candidate.

Embodiments of the omni-channel orchestrated conversation system and the virtual conversation agent described in this specification differ from and improve upon currently existing options. In particular, some embodiments differ by providing the ability to ask follow-up questions regarding past experiences and skills based on the quality of the candidates' response enables the system to gather detailed information about candidates' experiences that can only be possible by today's mechanisms through human-based (i.e., human to human) telephonic candidate screening. The information derived from the follow-up questioning helps the omni-channel orchestrated conversation system to build (and maintain through automatic and continual machine learning updates) a robust hard skills fit model. The omni-channel orchestrated conversation system and virtual conversation agent also identify unique "business needs" signals that are beyond a candidate's skills, but which enables the omni-channel orchestrated conversation system and virtual conversation agent to create a holistic fitness of candidate. Additionally, the omni-channel orchestrated conversation system and virtual conversation agent generates and provides a well-constructed summary of the telephonic speech conversation.

The omni-channel orchestrated conversation system and the virtual conversation agent of the present disclosure may be comprised of the following elements. This list of possible constituent elements is intended to be exemplary only and it is not intended that this list be used to limit the omni-channel orchestrated conversation system and the virtual conversation agent of the present application to just these elements. Persons having ordinary skill in the art relevant to the present disclosure may understand there to be equivalent elements that may be substituted within the present disclosure without changing the essential function or operation of the omni-channel orchestrated conversation system and the virtual conversation agent.

1. A virtual conversation agent, which conducts a conversation with a human by phone, email, or text. The virtual conversation agent tries to converge email/text-based conversations with the human into telephonic speech conversations with the human. The virtual conversation agent fluidly and seamlessly converses with the human throughout the conversation. For example, the virtual conversation agent may be deployed by a company seeking job candidates and wishing to identify candidates that are suitable for particular jobs. As such, the virtual conversation agent would conduct a job candidate screening process based on telephonic speech conversation with one or more human candidates.

2. A conversation transformation module that transforms spoken conversation responses from a candidate into text responses that are analyzed for quality, etc. That is, the candidate's responses are captured and then transformed into categorized structured data. The categorized structured data is then fed to the artificial intelligence (AI) engine and machine learning (ML) sub-system for evaluation with respect to the natural language understanding AI model. The conversation transformation module is also configured to transform textual follow-up questions and responses into audible conversational questions and responses that are audibly spoken by the virtual conversation agent.

3. An artificial intelligence (AI) engine and machine learning (ML) sub-system which build a machine learning model (also referred to as the "natural language understanding AI model") used to determine quality of the candidate's responses and generate possible probing follow-up questioning and responses. In some embodiments, the AI engine and ML sub-system include a machine learning compositing module that updates the machine learning model (or natural language understanding AI model) as a composite of past responses and input data currently fed to the machine learning model (or natural language understanding AI model).

4. A scoring system comprising a fitness scoring and summary generation module that scores candidate fitness for jobs or for a particular goal or purpose. Scoring for fitness is based on comparable items (e.g., job requirements compared to job experience or education of candidates) and is also based on holistic fitness of the human for a purpose or a goal (e.g., whether, as a candidate, the human candidate would be suitable for job).

5. A report and communication generation engine (also referred to as a "reporting engine") that is configured to generate a well-constructed conversation summary with fitness scores, skills details, and business needs signals categorized into highlights, lowlights, and other considerations.

6. A previous conversations database that is configured to store data of previous conversations between candidates and human or virtual agent.

The omni-channel orchestrated conversation system and the virtual conversation agent of the present disclosure generally works by deploying the virtual conversation agent to engage in conversation with a human in any of several manners including, without limitation, phone conversations, email conversations, and text conversations. The virtual conversation also tries to converge email and text conversations into phone conversations. When the conversation is then in phone conversation mode, the virtual conversation agent of some embodiments captures audible telephonic responses from the human/candidate. The captured responses are transformed by the conversation transformation module of the omni-channel orchestrated conversation system from spoken word to unstructured text, and then from unstructured text into structured data. When the conversation transformation module is finished, the structured data is provided as input to a machine learning model (or "natural language understanding AI model") built by and utilized for response quality processing by the artificial intelligence (AI) engine and machine learning (ML) sub-system. Initially, the machine learning model (or "natural language understanding AI model") is built by the artificial intelligence (AI) engine and machine learning (ML) sub-system to calculate fitness values (e.g., candidate fitness values) according to several parameters or aspects related to the particular domain of focus (e.g., suitability for a job with particular job requirements) for the conversation between the virtual conversation agent and the human (candidate). In the domain of employment and candidate recruiting, for example, the machine learning model (or "natural language understanding AI model") is built to calculate hard skills fit based on the total years of years, skills mentioned by the candidates, years of experience per skills, duties performed by the candidate in their past job and roles performed by the candidate in the past. In parallel, the natural language understanding AI model (or machine learning model) is built by the artificial intelligence (AI) engine and machine learning (ML) sub-system to calculate the soft skills score based on the textual sentiments of the words spoken by the candidate, the use of filler words and the use of impactful words in the telephonic speech conversation. Thereafter, a composite natural language understanding AI model (composite machine learning model) is created that uses the hard skills fit score, the soft skills score and other business decision points such as job status, candidate availability for interview, ongoing interview status, alternate offer status, expected salary, negotiable salary, ability to relocate, availability to start on the job, notice period at current company, work authorization, mutual exclusivity to be represented by a staffing company, to arrive at an overall fit of the candidate for a role.

To make the omni-channel orchestrated conversation system and the virtual conversation agent of the present disclosure, a person may design, write (code or encode), build, and deploy software modules/programs for the omni-channel orchestrated conversation system and the virtual conversation agent to operate as a virtual telephonic bot to make telephony calls and then use code criteria to score the candidate based on qualitative factors. In some embodiments, the software implements the omni-channel orchestrated conversation process for conducting realtime contextual and fluid conversation with a human by a virtual conversation agent. In some embodiments, different software modules, software programs, and/or software applications may implement different parts of the omni-channel orchestrated conversation process for conducting realtime contextual and fluid conversation with a human by a virtual conversation agent. Details of the omni-channel orchestrated conversation process for conducting realtime contextual and fluid conversation with a human by a virtual conversation agent are described next, by reference to FIGS. 1-3.

By way of example, FIG. 1 conceptually illustrates a first part of an omni-channel orchestrated conversation process 100 for conducting realtime contextual and orchestrated omni-channel conversation with a human by a virtual conversation agent. As shown in this figure, the first part of the omni-channel orchestrated conversation process 100 starts with a virtual conversation agent (also referred to as the "bot") analyzing previous conversation notes on a human candidate (at 110) to decide on whether to initiate a new conversation. For example, the human candidate may have been in communication previously with another bot or a human recruiter of a company seeking candidates for one or more jobs and, therefore, there may be notes from the previous conversations. The virtual conversation agent of some embodiments automatically reviews past notes before reaching out to candidates, thereby ensuring that contextual history with the candidate is maintained for better communication and more fluid, human-like conversation between the virtual conversation agent and the human candidate. Also, while this example for the omni-channel orchestrated conversation process 100 pertains to human candidates for jobs, a person of ordinary skill in the art would appreciate that the omni-channel orchestrated conversation process for conducting realtime contextual and orchestrated omni-channel conversation with a human by a virtual conversation agent can be adapted for any of several needs in pursuit of goals directed toward any of several domains or areas of focus.

Next, the first part of the omni-channel orchestrated conversation process 100 proceeds to a step at which the conversation is initiated between the human candidate and the virtual conversation agent (at 120) by way of a phone call, a text message, or an email. Also, the conversation can be initiated by either party—that is, the virtual conversation agent or the human candidate can reach out via one of the channels of communication (phone, email, text) to initiate a conversation.

In some embodiments, the first part of the omni-channel orchestrated conversation process 100 determines (at 130) whether the human candidate is responsive to the bot. Specifically, if the virtual conversation agent initiated the conversation, is the human candidate making some form of response back to the bot? When the human candidate is responsive to the bot ('YES'), then the first part of the omni-channel orchestrated conversation process 100 proceeds forward to a second part of the omni-channel orchestrated conversation process, which is described in further detail below, by reference to FIG. 2. On the other hand, when the human candidate is determined (at 130) not to be responsive to the virtual conversation agent ('NO'), then the first part of the omni-channel orchestrated conversation process 100 proceeds to a step for determining (at 140) whether the virtual conversation agent initiated the conversation by phone or not. When the virtual conversation agent did not initiate the conversation by phone ('NO'), the first part of the omni-channel orchestrated conversation process 100 continues ahead to a step at which the virtual conversation agent sends a follow-up text message, email message, makes a phone call (or leaves a voicemail message) to the human candidate requesting a response within a certain time frame (at 160). However, when the virtual conversation agent affirmatively did initiate the conversation by phone ('YES'), then the first part of the omni-channel orchestrated conversation process 100 proceeds to a step at which the virtual conversation agent leaves a voicemail message if the human candidate does not pick up the phone (at 150). Then the omni-channel orchestrated conversation process 100 continues forward to the step at which the virtual conversation agent sends a follow-up text message or email message (in this case, no call or voicemail, since a voicemail message was already left from the initial phone call to the human candidate) requesting a response from the human candidate within the particular time frame (at 160).

In some embodiments, the first part of the omni-channel orchestrated conversation process 100 waits for a response from the human candidate and determines (at 170) whether the candidate responded within the time frame or not. In some embodiments, the first part of the omni-channel orchestrated conversation process 100 automatically listens for response from the candidate by way of a backend communication event triggering process of a server for the omni-channel orchestrated conversation system. Thus, when a candidate response is received via email, text message, and/or phone call, the first part of the omni-channel orchestrated conversation process 100 of some embodiments checks to see whether the response is within the time frame and ('YES') then transitions back to the step at which the conversation is initiated between the human candidate and the virtual conversation agent (at 120) and proceeding as noted above. However, when the time frame expires, the first part of the omni-channel orchestrated conversation process 100 is triggered by the backend communication event triggering process to proceed to a different step at which the virtual conversation agent generates and sends an email summary to the company that deployed the bot (at 180). The email summary indicates that the human candidate was not reached and/or did not engage in conversation.

Now, turning back to the determination (at 130) of whether the human candidate is responsive to the virtual conversation agent or not. When the human candidate is determined (at 130) to be responsive to the virtual conversation agent ('YES'), the omni-channel orchestrated conversation process proceeds to steps of a second part of the omni-channel orchestrated conversation process 200, which is now described by reference to FIG. 2.

Figure 2:
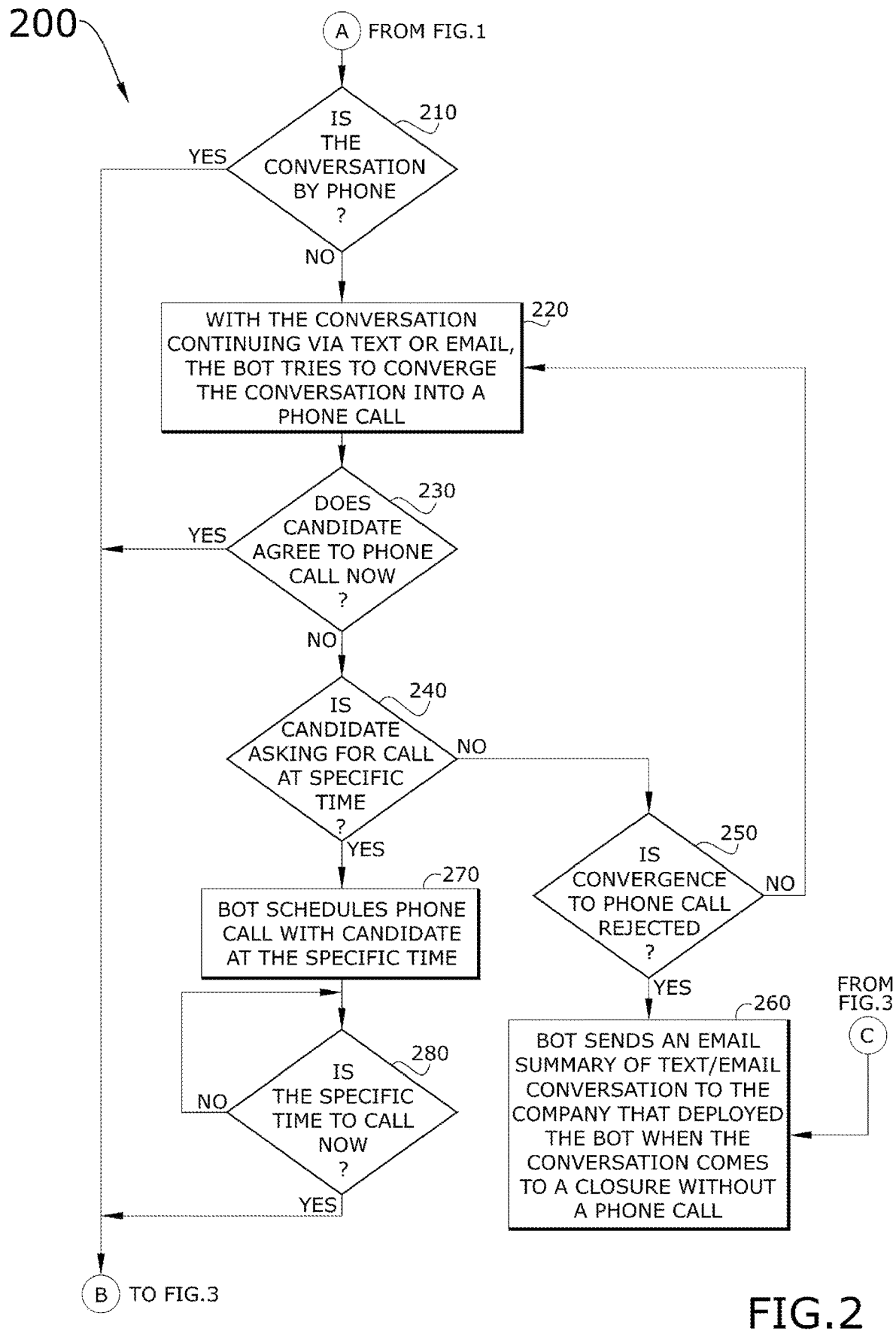
FIG. 2 conceptually illustrates a continuation of the omni-channel orchestrated conversation process for conducting realtime contextual and orchestrated omni-channel conversation with a human by a virtual conversation agent of FIG. 1.

Specifically, and turning to FIG. 2, a second part of the omni-channel orchestrated conversation process 200 is shown. The second part of the omni-channel orchestrated conversation process 200 continues by determining (at 210) whether the conversation is being conducted by phone or not. When the conversation between the human candidate and the virtual conversation agent is affirmatively being conducted by phone ('YES'), the second part of the omni-channel orchestrated conversation process 200 transitions to steps of a third part of the omni-channel orchestrated conversation process, which is described in detail below, by reference to FIG. 3.

On the other hand, when the conversation between the human candidate and the virtual conversation agent is not determined (at 210) to be by phone ('NO'), then the conversation is being conducted via email or text messaging. Thus, the second part of the omni-channel orchestrated conversation process 200 performs a step at which the virtual conversation agent tries to converge the email/text conversation into a phone conversation (at 220). However, the virtual conversation agent cannot converge the conversation into a phone conversation without the acquiescence of the human candidate. Therefore, the second part of the omni-channel orchestrated conversation process 200 determines (at 230) whether the human candidate agrees to converge the conversation into a phone conversation by way of a present phone call. When the human candidate agrees to have a phone call now ('YES'), the second part of the omni-channel orchestrated conversation process 200 carries on to the steps in the third part of the omni-channel orchestrated conversation process described below, by reference to FIG. 3.

On the other hand, when it is determined (at 230) that the human candidate does not agree to have a phone call now ('NO'), then the second part of the omni-channel orchestrated conversation process 200 determines (at 240) whether the human candidate is requesting a phone call at a specific later time, instead of a phone call now. When it is determined (at 240) that the human candidate is not requesting or asking for a phone call at a specific later time ('NO'), then the second part of the omni-channel orchestrated conversation process 200 determines (at 250) whether the human candidate is rejecting convergence of the conversation to a phone call conversation. When convergence of the conversation to a phone conversation is not determined (at 250) to be rejected by the human candidate ('NO'), then the second part of the omni-channel orchestrated conversation process 200 transitions back to the step at which the virtual conversation agent attempts to converge the conversation into a phone call (at 220), continuing forward as described above. However, when convergence of the conversation to a phone conversation is affirmatively determined (at 250) to be expressly rejected by the human candidate ('YES'), then the second part of the omni-channel orchestrated conversation process 200 proceeds to a different step at which the virtual conversation agent generates and sends an email summary of the text/email conversation to the company that deployed the virtual conversation agent when the conversation comes to a closure without a phone call between the virtual conversation agent and the human candidate (at 260).

Turning back to the determination (at 240) of whether the human candidate is requesting or asking for a phone call at a specific time that is later than the current time now, and when the human candidate has indeed requested or asked for a phone call to be scheduled at a specific, later time ('YES'), the second part of the omni-channel orchestrated conversation process 200 of some embodiments proceeds to a step at which the virtual conversation agent schedules a phone call (at 270) with the human candidate at the specific, later time. Then, after scheduling the phone call (at 270) with the human candidate at the specific time, the second part of the omni-channel orchestrated conversation process 200 determines (at 280) whether the specific time to call the human candidate is the present time (now). The determination (at 280) is checked at intervals of any length. For example, the current time may be checked and compared to the specific time every minute or every second after the virtual conversation agent schedules (at 270) the phone call with the human candidate. Thus, when the specific time to call the human candidate is not determined (at 280) to be the present time ('NO'), the second part of the omni-channel orchestrated conversation process 200 transitions and repeats in a cycle the time checking and comparing associated with the determination (at 280) of whether the specific time to call the human candidate is the present time (now).

Figure 3:
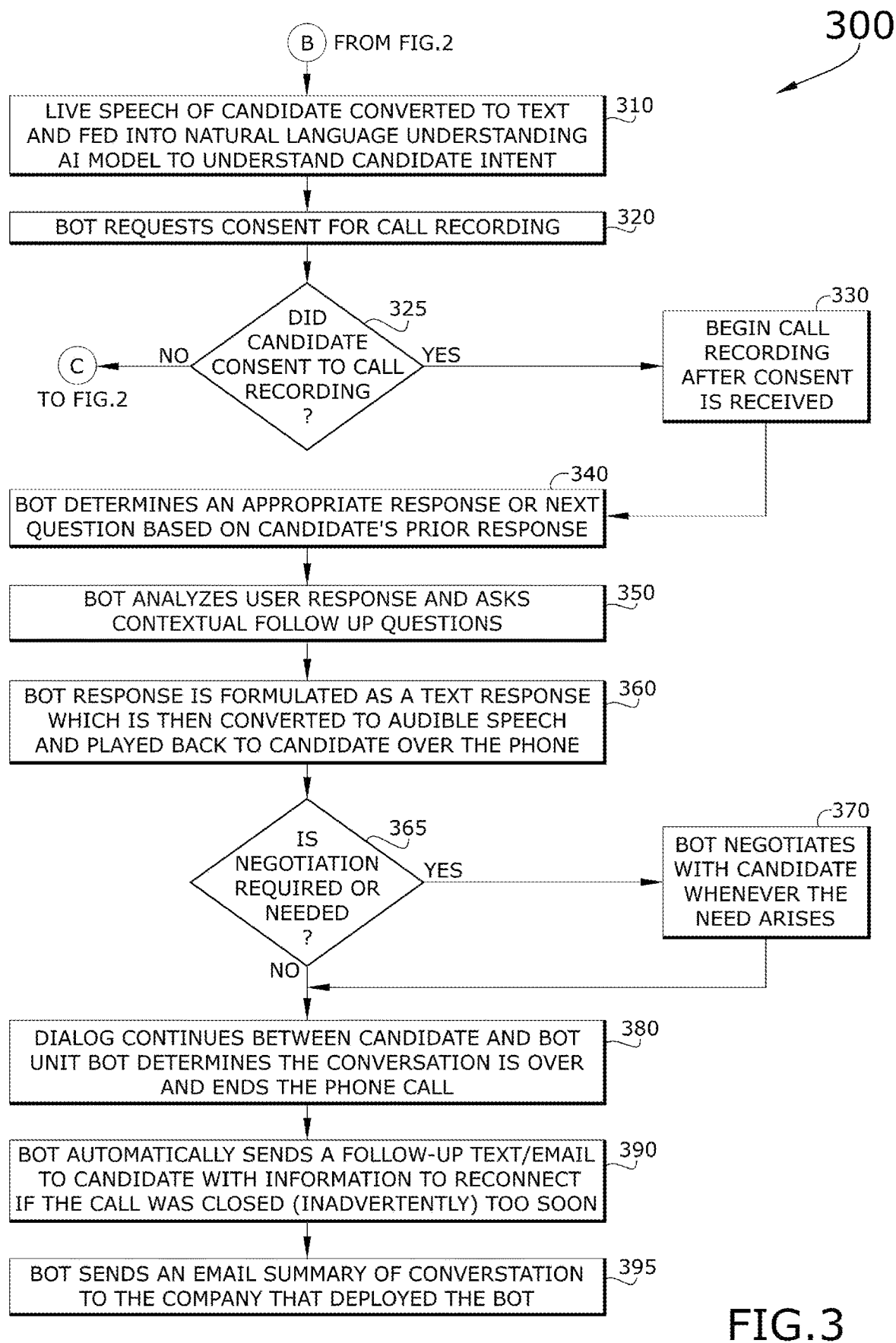
FIG. 3 conceptually illustrates a continuation of the omni-channel orchestrated conversation process for conducting realtime contextual and orchestrated omni-channel conversation with a human by a virtual conversation agent of FIG. 2.

On the other hand, when the specific time to call the human candidate is affirmatively determined (at 280) to be the same as the present time ('YES'), then second part of the omni-channel orchestrated conversation process 200 transitions forward to the steps of the third part of the omni-channel orchestrated conversation process, which is described next, by reference to FIG. 3.

Specifically referring to FIG. 3, and continuing where FIG. 2 left off, the third part of the omni-channel orchestrated conversation process 300 starts with a phone call that is either currently ongoing (when the original conversation was by phone) or initiated now by the virtual conversation agent to the human candidate (when the original conversation was by email or text, or the candidate was not responsive and a message was left followed by a subsequently initiated conversation). When the conversation is by phone call, live speech of the human candidate is captured and the third part of the omni-channel orchestrated conversation process 300 converts the live speech to unstructured text, which is then converted into structured text by the conversation transformation module and fed into the natural language understanding AI model to understand the intent of the spoken (now textual) words of the human candidate (at 310). Contemporaneously, the third part of the omni-channel orchestrated conversation process 300 performs a step at which the virtual conversation agent requests consent from the human candidate to record the phone call (at 320). Consent by the candidate is needed in some embodiments to proceed with the phone conversation. Thus, the third part of the omni-channel orchestrated conversation process 300 determines (at 325) whether the candidate consents to call recording or not. When the human candidate does not consent ('NO'), the third part of the omni-channel orchestrated conversation process 300 transitions back to a step of the second part of the omni-channel orchestrated conversation process 200 in which the virtual conversation agent generates and sends an email summary of the text/email conversation to the company that deployed the virtual conversation agent when the conversation comes to a closure without a phone call between the virtual conversation agent and the human candidate (at 260).

On the other hand, when the human candidate affirmatively consents ('YES'), the third part of the omni-channel orchestrated conversation process 300 begins call recording (at 330) after the consent is received from the human candidate. As the virtual conversation agent engages in conversation with the human candidate, the third part of the omni-channel orchestrated conversation process 300 proceeds to determine appropriate responses or (next) questions by the virtual conversation agent based on the human candidate's prior response (at 340). Additionally, the third part of the omni-channel orchestrated conversation process 300 analyzes responses by the human candidate and asks contextually appropriate follow-up questions to the human candidate (at 350). In some embodiments, the third part of the omni-channel orchestrated conversation process 300 formulates responses for the virtual conversation agent (at 360) first at a textual response level which are then converted to audible speech and played back to the human candidate over the phone. The third part of the omni-channel orchestrated conversation process 300 also determines (at 365) whether negotiation between the human candidate and the virtual conversation agent is required or needed in connection with the current phone conversation with the human candidate. When needed, the virtual conversation agent of some embodiments negotiates with the human candidate (at 370). The ability to negotiate with the human candidate is possible by the virtual conversation agent whenever the need arises during the phone conversation. Also, many of the prior steps of the third part of the omni-channel orchestrated conversation process 300 may be performed multiple times—specifically, the steps at which the virtual conversation agent determines appropriate responses or (next) questions based on the human candidate's prior response (at 340), the virtual conversation agent analyzes responses by the human candidate and asks contextually appropriate follow-up questions to the human candidate (at 350), the virtual conversation agent formulates responses (at 360) at a textual response level which are then converted to audible speech and played back to the human candidate over the phone, and the virtual conversation agent determines (at 365) whether negotiation is needed or not.

In some embodiments, the third part of the omni-channel orchestrated conversation process 300 proceeds with the dialog of the phone conversation continuing between the human candidate and the virtual conversation agent until the virtual conversation agent determines that the phone conversation is over and ends the phone call (at 380). In some embodiments, the virtual conversation agent determines that the conversation is over when the phone call connection to the human candidate is severed. In some embodiments, the virtual conversation agent determines that the conversation is over based on key phrases spoken by the human candidate that signal closure. In some embodiments, the virtual conversation agent determines that the conversation is over by asking the human candidate whether there is anything else to add to the conversation and, upon receiving a response declining the invitation to add more to the conversation, stating a closure phrase. For example, the virtual conversation may ask whether there is "anything more you want to add or explain about your qualifications or relevance in connection with the job", and if the human candidate responds in the negative, the virtual conversation agent may respond appropriately with "OK, goodbye" or "thank you, goodbye".

In some embodiments, the third part of the omni-channel orchestrated conversation process 300 then moves on to a step at which the virtual conversation agent automatically sends a follow-up text/email to the human candidate to reconnect in the conversation if the phone call was (inadvertently or unexpectedly) closed too soon (at 390). Next, the third part of the omni-channel orchestrated conversation process 300 proceeds to a final step at which the virtual conversation agent generates and sends an email summary of the phone conversation to the company that deployed the virtual conversation agent (at 395). Then the omni-channel orchestrated conversation process ends.

Figure 4:
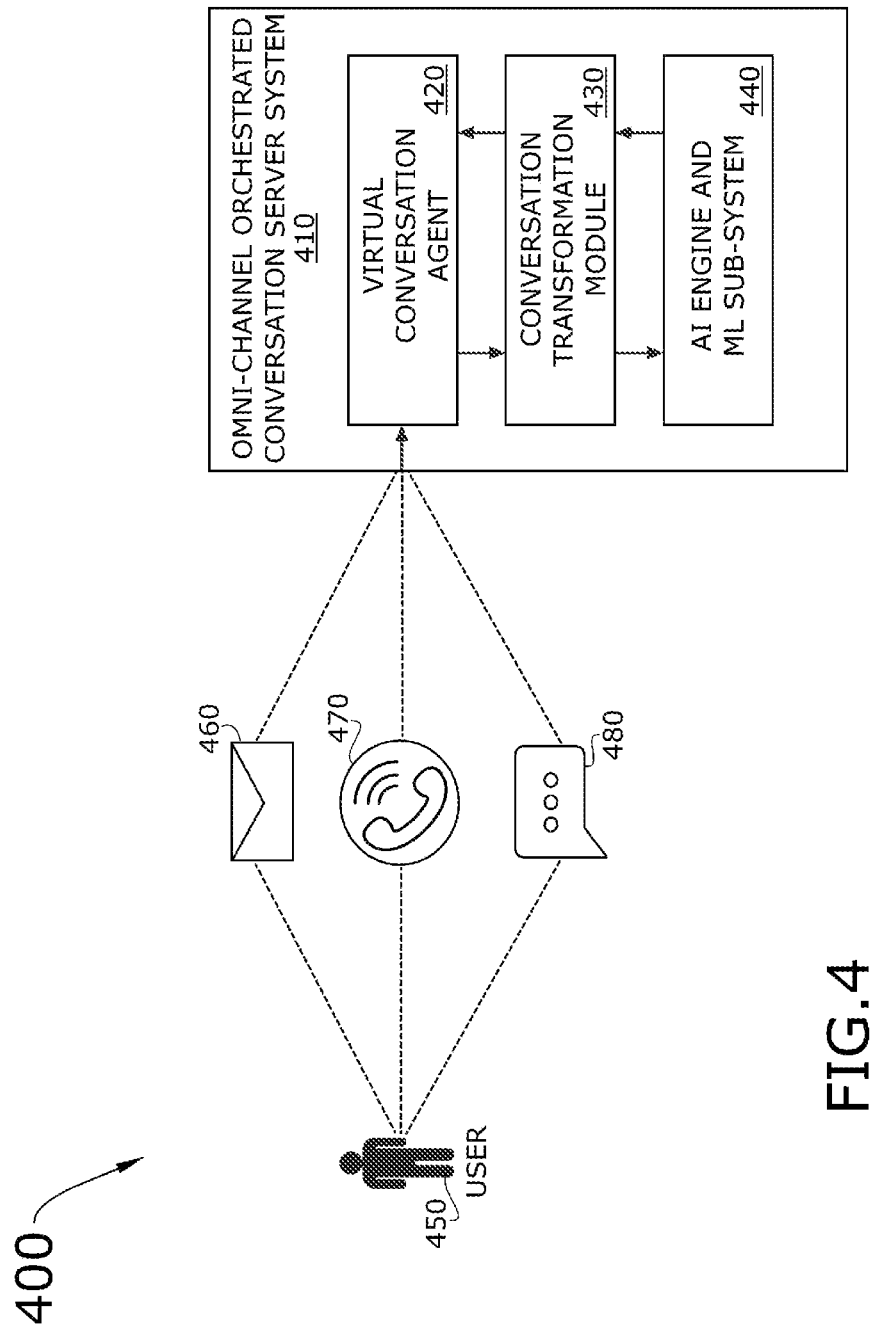
FIG. 4 conceptually illustrates an omni-channel orchestrated conversation system with a virtual conversation agent for realtime contextual and orchestrated omni-channel conversation with a human in some embodiments.

By way of another example, FIG. 4 conceptually illustrates an omni-channel orchestrated conversation system 400 with a virtual conversation agent for realtime contextual and orchestrated omni-channel conversation with a human in some embodiments. As shown in this figure, the omni-channel orchestrated conversation system 400 includes an omni-channel orchestrated conversation server system 410 and a human user 450 who engage in conversation by any of a plurality of omni-channel communication mechanisms, including an email channel 460, a phone channel 470, and a text messaging channel 480. The omni-channel orchestrated conversation server system 410 includes several components and functional elements, namely, a virtual conversation agent 420, a conversation transformation module 430, and an artificial intelligence (AI) engine and machine learning (ML) sub-system 440.

The omni-channel orchestrated conversation system 400 works by connecting the human user 450 and the virtual conversation agent 420 by way of at least one omni-channel communication mechanism—either the email channel 460, the phone channel 470, or the text messaging channel 480. When the email channel 460 or the text messaging channel 480 is initiated for the conversation, the virtual conversation agent 420 seeks out a way to converge the conversation with the human user 450 to a phone conversation across the phone channel 470. This may be a simple request that is generated by the virtual conversation agent 420 and sent to the human user 450 as an email or in a text message. When the phone channel 470 is the mechanism of the initiated conversation, or after the email/text conversation is converged into the phone conversation across the phone channel 470, the virtual conversation agent 420 communicates with the human user 450 in spoken words that reflect a fluid conversational style, like that of a human operator or human recruiter. While engaging in such audible conversation over the phone channel 470, the virtual conversation agent 420 records or captures the audible vocalizations of the human user 450 and passes the recorded/captured audio of the human user 450 to the conversation transformation module 430 which converts the pure audio to unstructured text that is a verbatim transcription of the human user 450 audio. The conversation transformation module 430 of some embodiments then transforms the unstructured text into structured text which is fed into the machine learning model (natural language understanding AI model) built by the artificial intelligence (AI) engine and machine learning (ML) sub-system 440. The natural language understanding AI model (machine learning model) is used by the AI engine and ML sub-system 440 to determine the quality of the responses elicited by the human user 450 and generate possible probing follow-up questioning and responses for the virtual conversation agent 420 to vocalize on the phone channel 470. However, before the virtual conversation agent 420 can audibly express such probing follow-up questions or responses to the human user 450 across the phone channel 470, the output from the AI engine and ML sub-system 440 (after processing the structured text fed to the natural language understanding AI model) needs to be converted from a textual format to audio. Thus, the output text from the AI engine and ML sub-system 440 is processed by the conversation transformation module 430 to generate audio of the probing follow-up questions or responses for the virtual conversation agent 420 to play back to the human user 450 across the phone channel 470.

In some embodiments, the artificial intelligence (AI) engine and machine learning (ML) sub-system 440 further includes a machine learning compositing module that updates the natural language understanding AI model as a composite of past responses and input data currently fed to the natural language understanding AI model.

While not shown in this figure, the omni-channel orchestrated conversation system 400 also includes a previous conversations database, a scoring system, and a report and communication generation engine. In some embodiments, the previous conversations database is configured to store data of previous conversations between human users (candidates) and virtual conversation agents or human agents (such as a human recruiters at a company, etc.). In some embodiments, the information and notes associated with the human user 450 which is stored in the previous conversations database is retrieved by the virtual conversation agent 420 before initializing the conversation. In this way, the virtual conversation agent 420 has contextual background from which to start the conversation with the human user 450 in a manner that a human would expect from another human.

In some embodiments, the scoring system includes a fitness scoring and summary generation module that is configured to score the human user's fitness for a goal or purpose (such as fitness for a particular job) after the AI engine and ML sub-system 440 has evaluated the quality of the responses by the human user 450. In some embodiments, scoring for fitness is based on comparable items (e.g., job requirements compared to job experience or education of the human user 450) and is also based on holistic fitness of the human for a purpose or a goal (e.g., whether, as a candidate, the human user 450 would be suitable for job).

In some embodiments, the report and communication generation engine is configured to generate emails, text messages, and well-constructed conversation summaries upon closure of conversations between the virtual conversation agent 420 (any deployed virtual conversation agent) and the human user 450 (any human user). In some embodiments, emails, text messages, summaries include detailed information about the conversation, as well as fitness scores, skills details, and business needs signals categorized into highlights, lowlights, and other considerations.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash storage (such as USB flash drives or SD flash memory modules), RAM chips, hard drives (including solid state storage devices "SSD"), EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
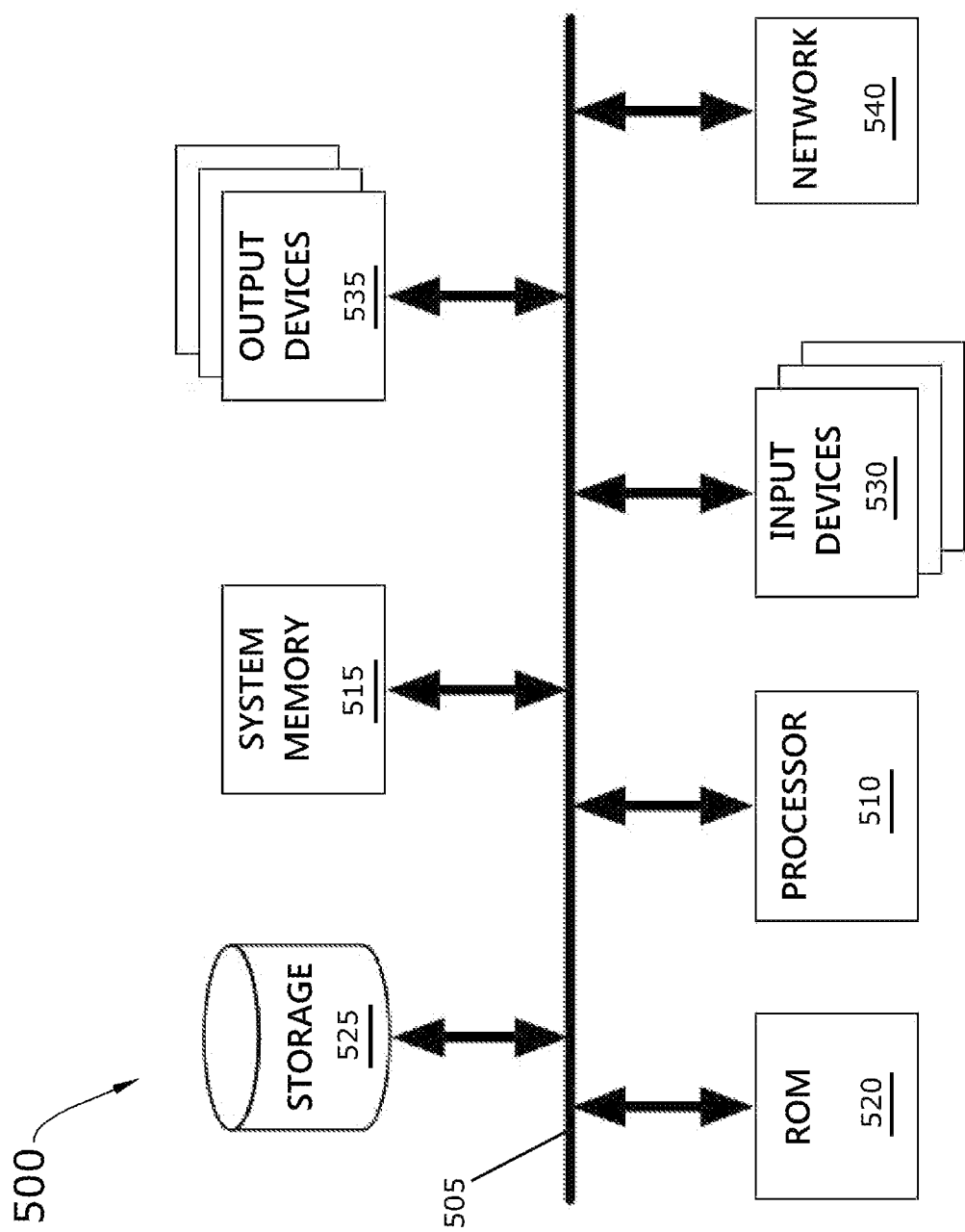
FIG. 5 conceptually illustrates an electronic system with which some embodiments of the invention are implemented.

FIG. 5 conceptually illustrates an electronic system 500 with which some embodiments of the invention are implemented. The electronic system 500 may be a computer, phone (cell phone, mobile phone, smartphone, etc.), PDA (digital assistant device, etc.), tablet computing device, single board computer (SBC), server, or any other sort of electronic device or computing device. Such an electronic system includes various types of computer readable media and interfaces for various other types of computer readable media. Electronic system 500 includes a bus 505, processing unit(s) 510, a system memory 515, a read-only memory 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525. From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only memory 520. For example, the various memory units include instructions for processing appearance alterations of animal temperature. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as liquid crystal displays (LCD) or organic light emitting diode (OLED) displays. Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General purpose and special purpose computing and storage devices can be interconnected through communication networks.

Some embodiments include electronic components, such as microprocessors, storage and memory that store computer program instructions in a machine-readable or computer-readable medium (alternatively referred to as non-transitory computer readable media, computer-readable storage media, machine-readable media, machine-readable storage media, or simply as media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

I claim:

1. A non-transitory computer readable medium storing an omni-channel orchestrated conversation program which, when executed by an omni-channel orchestrated conversation server, provides a virtual conversation agent to conduct realtime contextual and orchestrated omni-channel conversation with a human user, said omni-channel orchestrated conversation program comprising sets of instructions for:
analyzing previous conversation notes about a human user;
initiating a new conversation between the human user and a virtual conversation agent;
determining whether the human user is responsive to the virtual conversation agent;
requesting a response from the human user by the virtual conversation agent when the human user is not responsive;
determining whether the new conversation between the human user and the virtual conversation agent is a phone conversation when the human user is responsive to the virtual conversation agent;
requesting, by the virtual conversation agent, to converge the conversation into a telephonic speech conversation by a phone call between the virtual conversation agent and the human user when the new conversation is not the phone conversation;

staring the phone call between the virtual conversation agent and the human user when the human user agrees to converge the conversation into the telephonic speech conversation;

capturing and converting live speech from the telephonic speech conversation to structured text used to understand intent of the human user;

requesting consent from the human user to record the telephonic speech conversation;

recording the telephonic speech conversation when the human user consents to recording;

engaging in conversation between the virtual conversation agent and the human user during the telephonic speech conversation;

ending the phone call when the virtual conversation agent determines that the telephone speech conversation is finished; and generating and sending an email summary of the telephonic speech conversation to a company that deployed the virtual conversation agent.

2. The non-transitory computer readable medium of claim 1, wherein the new conversation is initiated as one of a phone conversation, an email conversation, and a text message conversation.

3. The non-transitory computer readable medium of claim 1, wherein the set of instructions for requesting the response from the human user comprises a set of instructions for setting a time duration for the human user to respond to the virtual conversation agent.

4. The non-transitory computer readable medium of claim 3, wherein the omni-channel orchestrated conversation program further comprises a set of instructions for generating and sending an email summary to the company that deployed the virtual conversation agent when one of the human user fails to respond within the time duration and the human user denies consent to record the telephonic speech conversation, wherein the email summary indicates that no conversation between the human user and the virtual conversation agent occurred.

5. The non-transitory computer readable medium of claim 1, wherein the set of instructions for engaging in conversation between the virtual conversation agent and the human user during the telephonic speech conversation comprises sets of instructions for:

determining appropriate virtual conversation agent responses comprising statements and questions, wherein the appropriate virtual conversation agent responses are based on one or more prior responses of the human user;

asking, by the virtual conversation agent, contextually appropriate follow-up questions to the human user;

determining whether negotiation between the human user and the virtual conversation agent is needed; and negotiating, by the virtual conversation agent, with the human user whenever negotiation is needed.

6. The non-transitory computer readable medium of claim 1, wherein the omni-channel orchestrated conversation program further comprises a set of instructions for automatically sending a follow-up message to the human user to reconnect the phone call and re-engage in the telephonic speech conversation when the phone call was ended too soon.

* * * * *